(12) United States Patent
Sumner, Sr.

(10) Patent No.: US 8,584,579 B1
(45) Date of Patent: *Nov. 19, 2013

(54) BOTTOM OPENING FRYER BASKET

(75) Inventor: Douglas Arthur Sumner, Sr., Sherwood, OR (US)

(73) Assignee: PRH1, LLC, Brush Prairie, WA (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/248,217

(22) Filed: Sep. 29, 2011

(51) Int. Cl.
*A47J 47/12* (2006.01)
*A47J 37/12* (2006.01)
*A47J 37/07* (2006.01)
*B65D 6/08* (2006.01)
*B65D 8/04* (2006.01)

(52) U.S. Cl.
USPC .............. 99/407; 99/413; 99/450; 220/494; 220/607

(58) Field of Classification Search
USPC ........... 99/407, 410, 411, 412, 413, 414, 415, 99/450; 220/494, 601; 221/194, 295, 306; 211/181.1; 426/389
See application file for complete search history.

(56) References Cited

U.S. PATENT DOCUMENTS

| 8,037,812 B1 * | 10/2011 | Sumner, Sr. ................... 99/407 |
| 2008/0124438 A1 * | 5/2008 | Forte et al. ................... 426/389 |

* cited by examiner

*Primary Examiner* — Sang Paik
*Assistant Examiner* — Joseph Iskra
(74) *Attorney, Agent, or Firm* — Dowell & Dowell, P.C.

(57) ABSTRACT

A fryer basket having at least one bottom panel that is normally retained in a closed relationship relative to side walls of the basket but which is released to pivot to an open position upon operation of a latching mechanism that is operable adjacent to a handgrip of a handle connected to the basket and wherein a blocking member carried by the at least one bottom panel prevents the latching mechanism from returning to its closed position until the at least one bottom panel is returned to its closed positioned after having been opened.

16 Claims, 5 Drawing Sheets

BOTTOM OPENING FRYER BASKET

BACKGROUND OF THE INVENTION

1. Field of the Invention

The present invention relates to fryer baskets and more particularly to heavy duty or commercial long handle fryer baskets that are used to support food items being cooked by being immersed in cooking oil within a fryer. More particularly, the invention is directed to the field of such fryer baskets with one or more bottom opening panels.

2. Brief Description of the Related Art

Commercial fryer baskets, also known as deep fat fryer baskets, include an open mesh-like structure that forms a receiver or container for retaining a food product to be cooked when immersed in a fryer vat or tub. The receiver or container is welded or otherwise secured to an elongated handle that is designed to extend outwardly beyond the fryer vat or tub so that the handle may be safely grasped without a person having to extend their hands above hot oil within the fryer vat or tub.

In use, a conventional fryer basket is initially filled with a food product such as french fries, coated onion rings, chicken, and the like, after which the basket lowered into a vat or tub of heated cooking oil until seated such that the handle thereof extends outwardly from the fryer vat or tub. After the food product is cooked, a worker responsible for the fried product engages the handle of the basket and elevates the basket from the vat of cooking oil. The basket must normally be retained above the vat of cooking oil for a brief period so that oil from the basket and the food product may drip back into the vat. Once the food product is sufficiently drained, the food product must be removed from the fryer basket. With convention fryer baskets, the food product is removed by the worker turning the basket upside down over a food retention bin or area so that the food product is discharged by gravity from an open top of the fryer basket.

The weight of long handle fryer baskets can very greatly from less than a pound to several pounds, or more, depending on the size of the basket and the food product being cooked. Further, because the weight of the basket and food product is at the end of the handle spaced from a workers hand(s) and wrist(s), the amount of stress being placed on the workers hand(s) and wrist(s) is considerable. Considering the number of times it may be necessary for a worker to rotate loaded fryer baskets to discharge food products during a given work shift, it is not unusual for workers to develop or experience hand, wrist and forearm pain from fatigued and strained muscles, ligaments, tendons and joints. Once a worker develops an injury, the chance of an accident occurring during the handling and manipulating of loaded fryer baskets is significantly increased.

To facilitate the dispensing of cooked food items from fryer baskets in an effort to reduce worker effort, several recent proposals have been made to manufacture fryer baskets with opening bottom walls or panels which pivot to an open position when a worker operates a release mechanism associated with the fryer basket. Although fryer baskets having bottom walls that open by manually operated release mechanism reduce that amount worker stress by eliminating the wrist and forearm pivoting motion required to rotate conventional fryer baskets to discharge cook food product, there remain problems with respect to the quick and safe closure of the pivotal bottom walls or panels of such fryers. Often, the pivotal bottom walls may not readily pivot back to the closed and locked position without manual manipulation of the bottom walls or panels or the release operating mechanisms. In either case, such additional manual manipulation is time consuming, unsafe and potentially unhealthy. Further, after a worker manually contacts parts of the fryer that are coated with oil, the worker must clean his or her hands before performing any addition work within a kitchen.

In view of the foregoing, there is a need to provide a new type of long handle fryer basket having a manually releasable bottom opening wall or panel that prevents muscle, ligament, tendon and joint strain and injury and which also closes easily after being opened to dispense cooked food products without the need for manual engagement of any portion of the basket that is exposed to cooking oil.

SUMMARY OF THE INVENTION

This invention is directed to a long handle fryer basket that does not have to be rotated to discharge product through the top opening therein but that includes at least one selectively pivotally opening bottom wall or panel that is opened by manual manipulation of a operating member provided adjacent a portion of the handle that is grasped by an individual to raise and lower the basket relative to a fryer. A latch mechanism is mounted to the basket and includes a latch that is normally positioned along a lower portion of the fryer basket in a locked positions wherein it engages the at least one pivotally opening bottom panel to thereby retain the bottom panel in a closed position to retain food product within the fryer basket. However, the latch is connected by a lever to the operating member so that when the operating member is triggered by an individual, the latch is moved to a release or open position free of the at least one bottom panel, thereby permitting the at least one bottom panel to pivot downwardly to create a discharge opening through which food product within the basket is discharged.

As the at least one bottom panel is pivoted to the release or open position to discharge food product from the basket the latch is automatically retained in the open position. Once the food product is discharged from the basket, the at least one opened bottom panel may be lowered against a surface to thereby pivot the at least one bottom panel to the closed position. As the at least one bottom panel is moved to the closed position, the latch is automatically moved to the locked position retaining the at least one movable bottom wall or panel in the closed position.

In a preferred embodiment of the invention, the bottom of the fryer basket is formed of a single wall or panel which is pivotally connected to one of the lower frame of the basket so as to be freely pivotally movable by gravity to a vertically depending open position when released and not retained in its closed position by the latch. In this embodiment, a single latch is preferably used to engage or disengage the at least one pivotal bottom panel. In some embodiments, two bottom panels may be pivotally secured to the lower frame of the fryer basket. In this embodiment, a single latch is preferably used, however, in some embodiments, separate latches may be used to retain the two panels in their closed positions. The bottom walls or panels are also provided with two or more support bars or rods that are welded thereto and which support the bottom panels above a surface on which the basket is placed. Additional supports may be welded to the rear of the bottom frame of the basket.

Although the latch may have varying configurations, in the preferred embodiment shown, the latch is mounted at a lower end of a lever arm that is pivotally mounted to a front wall or panel of the basket adjacent the handle. The lever arm extends upward and rearward of a rear side panel of the basket to a free end having a operating or pusher pad or trigger secured thereto. The pad is positioned adjacent a handgrip of the handle that is used to manually lift and manipulate the basket. The pad is positioned to the rear of the basket body so as to be easily engaged by a person's finger or thumb to thereby urge the top of the lever arm toward the basket and thereby pivot the lever arm about a pivot point to move the latch to its release or open position spaced from the at least one movable bottom panel so that the bottom panel automatically opens under its own weight and the weight of the food product within the basket. The latch is continuous urged toward the locked position thereof by a spring mechanism that is mounted to urge the lever arm to a position wherein the latch is positioned beneath and in engagement with the bottom panel.

To prevent the latch from prematurely moving to its closed position by the force of the return spring and before the at least one bottom wall or panel is pivoted back to its closed position, such as by pivoting the at least one bottom panel of the fryer basket against an edge of the fryer vat, a blocking plate carried by the at least one pivotal bottom panel is mounted so as to extend upward from a rear portion of a frame of the bottom panel adjacent the rear panel or wall of the fryer basket to which the operating lever for the latch is mounted. The blocking plate slides against an inner surface of the rear wall of the basket as the bottom panel is opened and is positioned so as to be engaged by the latch to thereby prevent the latch from pivoting back toward its locking position until the at least one bottom panel is moved to its closed position, at which time, the blocking plate is spaced from the latch thereby permitting the latch to move to its closed position under the at least one bottom panel by the force of the return spring. As the blocking plate must block the latch when the at least one bottom panel is in a fully open position, the plate extends upwardly approximately two-thirds of the height of the rear wall or panel of the fryer basket when the at least one bottom panel is closed. An upper portion of the blocking plate is also spaced inwardly from a side wall of the fryer basket opposing the side of the basket to which the bottom panel is pivotally mounted so as not to engage the opposing side wall or panel when the at least one bottom panel is moved to its open position. When two bottom panels are used, one or both of the panels have a blocking plate mounted thereto.

To further control the pivoting motion of the at least one bottom wall or panel relative to the open position, at least one and preferably two or more spaced stops or lugs are mounted from the lower frame of the basket to which the at least one bottom panel is pivotally mounted. The stops extend outwardly from the lower frame a slight distance but far enough to prevent pivoting of the bottom panel beyond an angle of 90° relative to the bottom frame of the fryer basket and preferably between 60° to 80°. In this manner, the at least one bottom panel or wall is retained in a position to be easily engaged against a fixed surface to thereby move the bottom panel to a closed position without the need for being manually engaged.

It is the primary object of the present invention to provide a bottom dispensing fryer basket wherein cooked food product is discharged through a bottom of the fryer basket so that it is not necessary to rotate the basket to discharge food product therefrom.

It is another object of the invention to provide a fryer basket that is particularly beneficial for use in commercial cooking environments to reduce pain and injury to workers by preventing fatigue, stress and strain to muscles, tendons, joints and ligaments that results from the use of a conventional fryer that must be inverted to discharge product therefrom.

It is yet another object of the present invention to provide a bottom opening fryer basket wherein a latch retains at least one bottom panel of the fryer basket in a closed position when the latch is in a locked position and wherein the latch is prevented from returning to its locked position after releasing the at least one movable bottom panel until the at least one bottom panel is moved to its closed position and which thereafter is automatically moved to its locked position beneath the at least one bottom wall or panel.

It is also an object of the present invention to provide a bottom opening fryer basket wherein the degree or angle of opening of at least one pivotal bottom panel is limited as to make closure of the at least one bottom panel possible without being manually engaged by forcing the at least one bottom panel against a rigid surface.

BRIEF DESCRIPTION OF THE DRAWINGS

A better understanding of the invention will be had with reference to the accompanying drawings wherein.

DESCRIPTION OF THE PREFERRED EMBODIMENT

With continued reference to the drawings, a fryer basket 10 is shown that includes a front wall or panel 11, rear wall or panel 12, opposite side walls or panels 14 and 15 and a movable bottom wall or panel 16. The fryer basket is shown as being open at the top, however, in some embodiments the top may be closed by one or more top panels or walls, not shown. The fryer basket 10 is similar to heavy duty long handle commercial fryer baskets and is formed of upper and lower stainless steel or other food grade metal frames 22 and 24 that are connected by the walls. The panels or walls are formed of horizontally and vertically extending rods or heavy duty wire food grade materials 23 that are secured to one another to thereby define a plurality of openings there between. In some embodiments, the rods may be interweaved or formed of open wire mesh-like material, also being food grade materials. As shown in the figures, the walls are preferably integrally formed.

Figure 3:
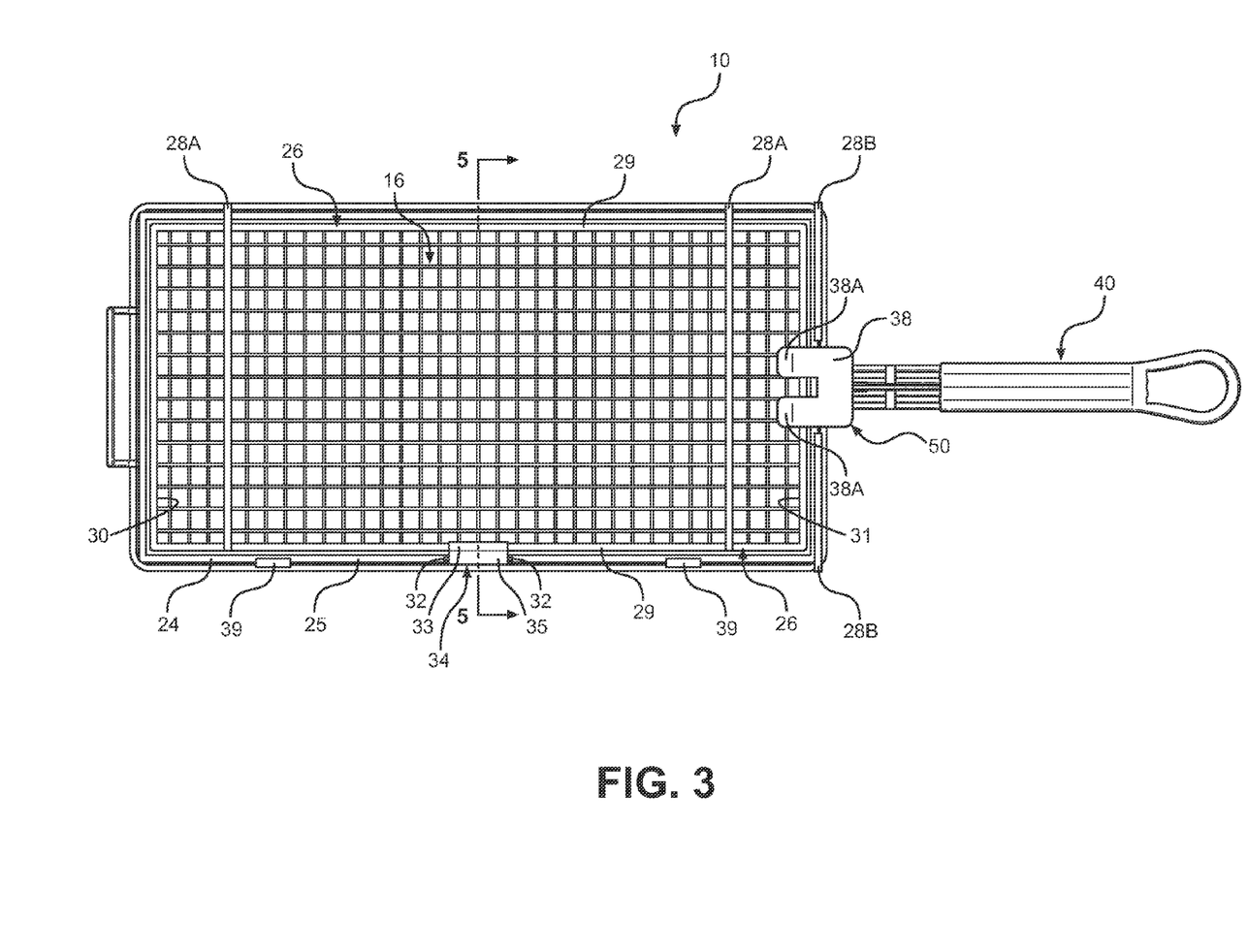
FIG. 3 is a bottom plan view of the fryer basket of FIG. 1 showing the latch in a locked position.

With reference to FIG. 3, the bottom wall is formed of a single panel 16 which includes a peripheral frame 26, that is reinforced by one or more cross members 28A. The frame 26 includes two parallel side members 29 and parallel front and rear members 30 and 31. The cross members 28A also serve as feet for the fryer basket and thus elevate the bottom panel 16 above a support surface. In addition, two additional cross members 28B are welded in spaced relation to one another to the rear portion 31 of the frame 26. The members 28B are spaced to provide clearance for a latch plate as will be described herein. The bottom wall or panel 16 is pivotally mounted to one of the side portions or members 29 of the bottom frame 24 by at least one hinge or pivot member 34 that is welded or otherwise fixedly secured at 33 to a side portion 29 the bottom panel frame 26 and a second open tubular portion 35 through which the adjacent side member 25 of the bottom frame 24 of the basket extends. Two small lugs 32 are welded to the side member 25 on opposite sides of the tubular portion 35 so as to prevent relative longitudinal motion between the bottom panel and the lower frame of the fryer basket.

Figure 1:
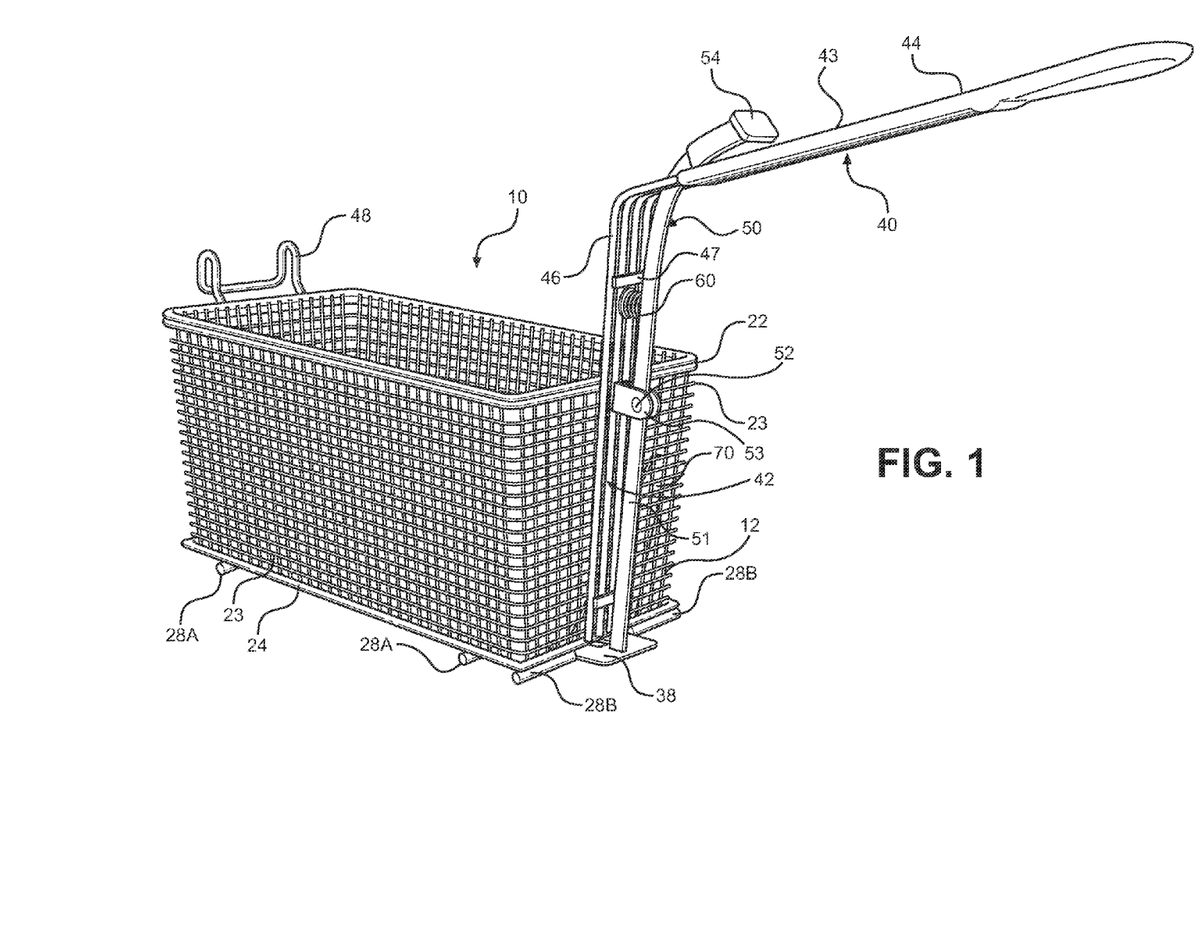
FIG. 1 is a rear perspective view of one form of fryer basket in accordance with the teachings of the present invention with the bottom panel of the basket being closed and being retained in the closed position by a latch which extends beneath the bottom panel adjacent a rear wall of the basket.
Figure 2:
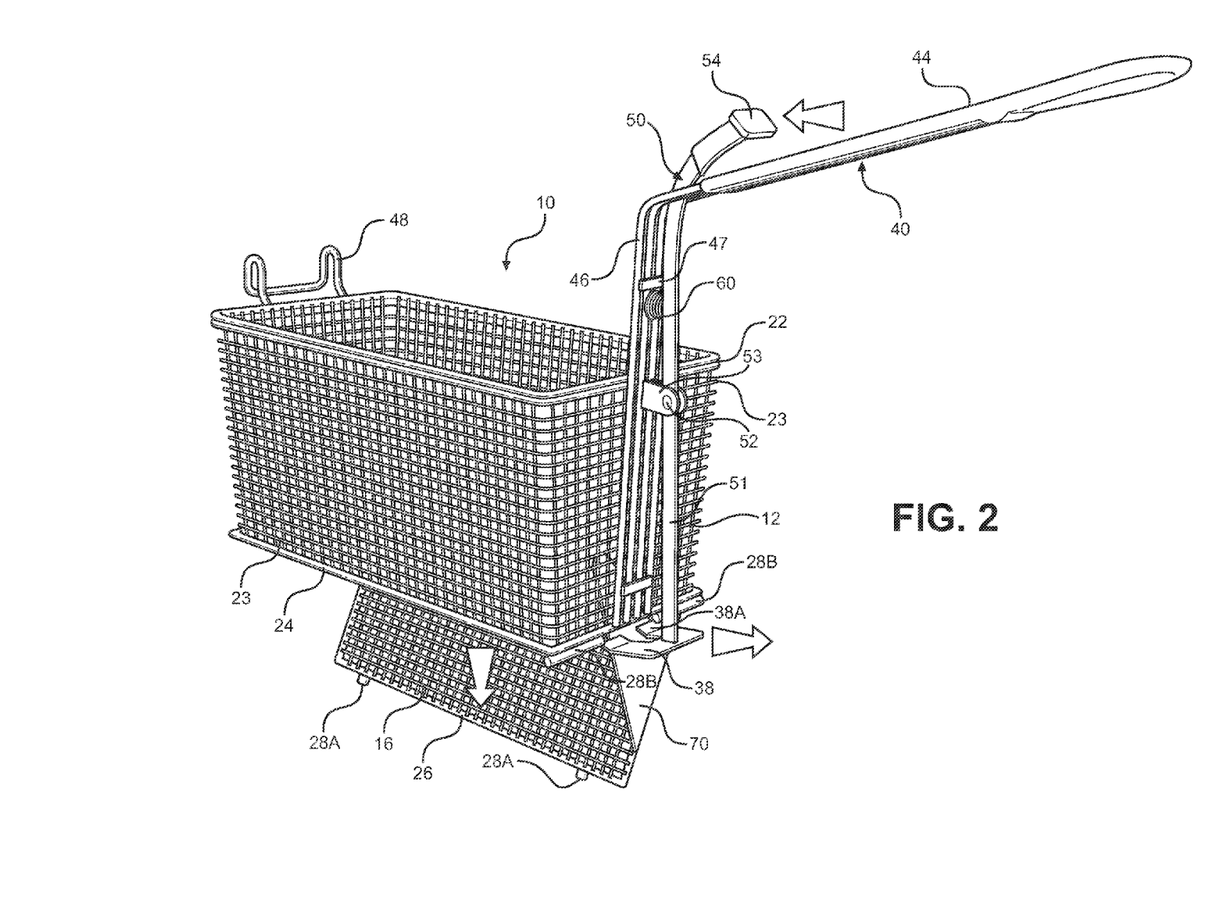
FIG. 2 is a rear perspective view similar to FIG. 1 except showing the bottom panel depending from the basket in an open position thereof to thereby permit discharge of food products from the basket.
Figure 5:
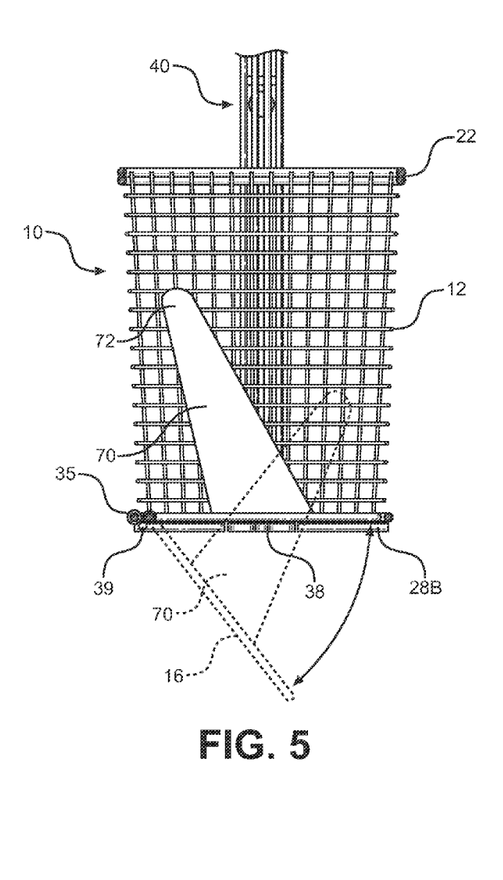
FIG. 5 is a cross sectional view taken along line 5-5 of FIG. 3 illustrating the pivotal motion of the bottom panel.

In use, it is preferred that the pivoting motion of the bottom wall or panel be limited between a fully closed position as shown in FIGS. 1 and 3 to a fully open position which is not greater than 90° from the closed position, and which position is preferably between 60° and 80° as illustrated in FIG. 2. In some embodiments, two or more spaced hinge or pivot members may be used to pivotally secure the bottom panel to the bottom frame 24. The at least one hinge or pivot member 34 permits the bottom panel to pivot freely under its own weight to the open position when the bottom panel is not retained in its closed position, as shown in FIGS. 1 and 3, by a retention latch plate 38, as will be described in greater detail hereinafter. To limit the pivoting motion of the bottom panel 16, a pair of stops 39 are welded to the bottom frame 24 on opposite ends of the at least one hinge or pivot member 34 and extend downward therefrom as shown in FIG. 5 so that as the bottom panel pivots about the side member 29 of the lower basket frame 24, the outer frame 26 thereof will engage the stops before the bottom panel can swing farther than 90° relative to its fully closed position. It is important to limit the pivoting motion of the bottom panel in order to maintain the bottom panel in a position to facilitate its closing. By maintaining the bottom panel at an angle of slightly less than 90°, such as between 60° and 80°, the panel may be urged to a closed position by simply resting the basket against a surface such as a side edge of a fryer. In this manner, it is not necessary to manually manipulate the bottom panel to urge it to its closed position.

A handle 40 includes an inner portion 42 that is welded or otherwise secured to the rear wall 12 of the basket and an outward or rearward extending portion 43 that defines a handgrip 44 that is spaced rearward of the rear wall of the fryer basket. The handle is also formed of a food grade metal such as stainless steel. As shown, the inner portion 42 is formed of a plurality of stainless steel rods 46 reinforced by stainless steel cross members 47. The handgrip 44 is coated with an insulating plastic material such that it may be grasped in a person's hand even when the basket has been immersed in hot fryer oil for extended periods of time. A U-shaped support 48 is welded or otherwise secured to an upper portion or the upper frame 22 of the fryer basket and extends forward thereof for purposes of engaging a conventional support inside of a commercial fryer or an upper edge of the fryer. The U-shaped support extends to the lower frame 24 of the basket and is welded to both the upper and lower frames 22 and 24.

To normally retain the bottom panel or wall 16 in its closed position, as shown in FIGS. 1 and 3, a latch assembly 50 is mounted, such as by welding, to the inner portion 42 of the handle adjacent the rear wall 12 of the basket. The latch assembly includes the latch member or plate 38 that engages with a lower surface of bottom panel or wall 16, as shown in FIG. 3 and a lever member 51. Although the latch plate is shown as being bifurcated, the latch plate may be formed as a continuous plate. Also, the front portion 38A of the latch plate 38 is inclined upwardly to facilitate clearance between the latch plate and the bottom frame of the basket as the latch plate is moved between its open and closed positions and to urge the bottom panel 16 toward the closed position. The latch plate is welded or otherwise secured to a lower end of the lever member 51 that is pivotally mounted at 52 to a bracket 53 welded or otherwise secured to the inner portion 42 of the handle. The lever member extends upwardly from the latch plate to an upper portion that extends to the rear of the rear wall of the fryer basket to a point or area adjacent the handgrip 44 of the handle where the lever member is terminated by a push pad or operating member 54. The push pad is also covered with an insulating plastic material such that the pad may be engaged and pushed forward toward the basket, as shown in FIG. 2, even when the basket is hot. As shown in FIG. 2, when the pad 54 is pushed forward, the pivot lever 51 pivots about the pivot 52 and pulls the latch plate rearward of the bottom panel 16 of the basket, thus allowing the bottom panel to pivot open under its weight and the weight of any food items contained within the basket thereby discharging the food items without having to rotate the basket.

Due to the manner in which the bottom panel is pivotally connected to the lower frame of the basket, when the bottom panel is released by movement of the latch member moving to the open position thereof, the panel will open to such an extent that the entire contents of the basket will be automatically discharged without having to shake or further manipulate the basket, thus ensuring minimal stress on a persons muscles, ligaments and joints.

Figure 4:
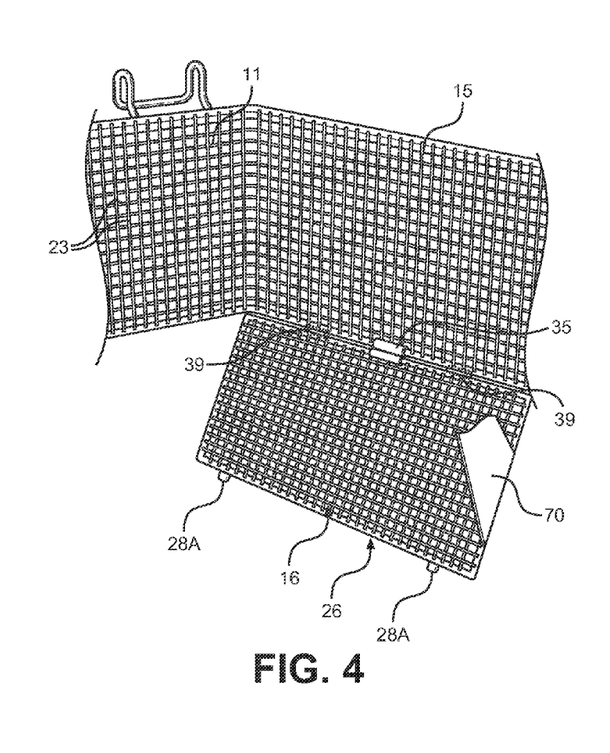
FIG. 4 is a view similar to FIG. 2 having portions broken away so as to show an interior blocking plate that is carried by the bottom panel and a pair of panel stops used for limiting opening movement of the bottom panel.

The latching mechanism is thus pivotally movable from a first position wherein the latch plate is in a locked position beneath the bottom panel of the fryer basket, see FIGS. 1 and 3, thereby preventing the bottom panel from opening, to a second open position wherein the latch plate is pivoted away from the bottom, see FIGS. 2, 4 and 5, thereby allowing the bottom panel to open. The latching mechanism also includes a return spring element 60 that is mounted above the bracket 53 so as to exert a constant force to urge the latch member toward the locked position thereof. As with the other components of the fryer basket, the latching mechanism is formed of a food grade metal or material.

As previously described, a unique feature of the present invention is that the bottom wall or panel 16 may be moved from its fully open position to its closed position without having to manually engage the bottom wall or other walls of the fryer basket. To accomplish this, however, the latch plate must be maintained in its unlocked position spaced to the rear of the fryer basket after the food products or items are discharged from the basket and until the bottom panel is moved to its closed position. With reference to FIGS. 2, 4 and 5, the fryer basket includes a latch plate blocking member 70 that is secured to the rear frame member 31 of the bottom panel 16.

The blocking member or plate 70 carried by the pivotal bottom panel is mounted so as to extend upward from a rear portion of the frame 26 of the bottom panel 16 adjacent the rear side panel or wall 12 of the fryer basket to which the operating lever for the latch is mounted. The blocking plate slides against an inner surface of the rear end wall 12 of the basket as the bottom panel 16 is opened and is positioned, and is of a size, to be engaged by the latch when the latch is moved to its open or release position and the bottom panel is open to thereby prevent the latch from pivoting back toward its locking position until the at least one bottom panel is moved from its fully open position, as illustrated in FIG. 5, to its closed position. When the bottom panel moves to its closed position, the blocking member is spaced from the latch thereby permitting the latch to move to the closed position under the at least one bottom panel by the force of the return spring 60. As the blocking member must block the latch when the at least one bottom panel is in a fully open position, the blocking member 70 extends upwardly approximately two-thirds of the height of the rear end wall of the fryer basket when the at least one bottom panel is closed, as shown in FIG. 5. An upper portion 72 of the blocking member is also spaced inwardly from the side wall 15 of the fryer basket to which the bottom panel is pivotally mounted and is shaped so as not to engage the opposing side wall 14 of the basket when the bottom pivots to its fully open position. As shown, the blocking plate 80 is somewhat triangularly shaped and is flat.

In addition to preventing the latch plate 38 from moving to its closed position until the bottom panel 16 is moved to its closed position, the blocking member 70 stabilizes the pivoting motion of the bottom panel by sliding against the rear wall 12 of the basket during opening and closing motions. This prevent the bottom panel from moving when fully opened until the basket is urged against a surface to force the bottom panel to move to its closed position.

In the use of the fryer basket, with the bottom panel 16 in the closed position as shown in FIGS. 1 and 3, food product may be placed within the basket 10 and the basket placed in a hot oil fryer. After the product is cooked, a person lifts the basket by grasping the handgrip 44. After sufficient drain time, the basket is positioned over a food collection area at which time the latching mechanism is operated by pushing on the push pad or operating member 54 in a direction as shown by the arrow in FIG. 2 thereby pivoting the lever member against the spring element 60 and moving the latch plate 38 to the open position thereof so that the bottom panel drops open discharging the cooked food product from the basket as illustrated in FIG. 2. After the food is discharged, the blocking member 70 prevents return of the latch plate 38 to its closed position until the bottom panel is moved to its closed position by lowering the basket against a surface to pivot the bottom panel to its closed position. As soon as the bottom panel is moved to its closed position, the return spring 60 automatically forces the latch plate 38 to its closed position such that addition food product may be loaded into the basket.

Figure 6:
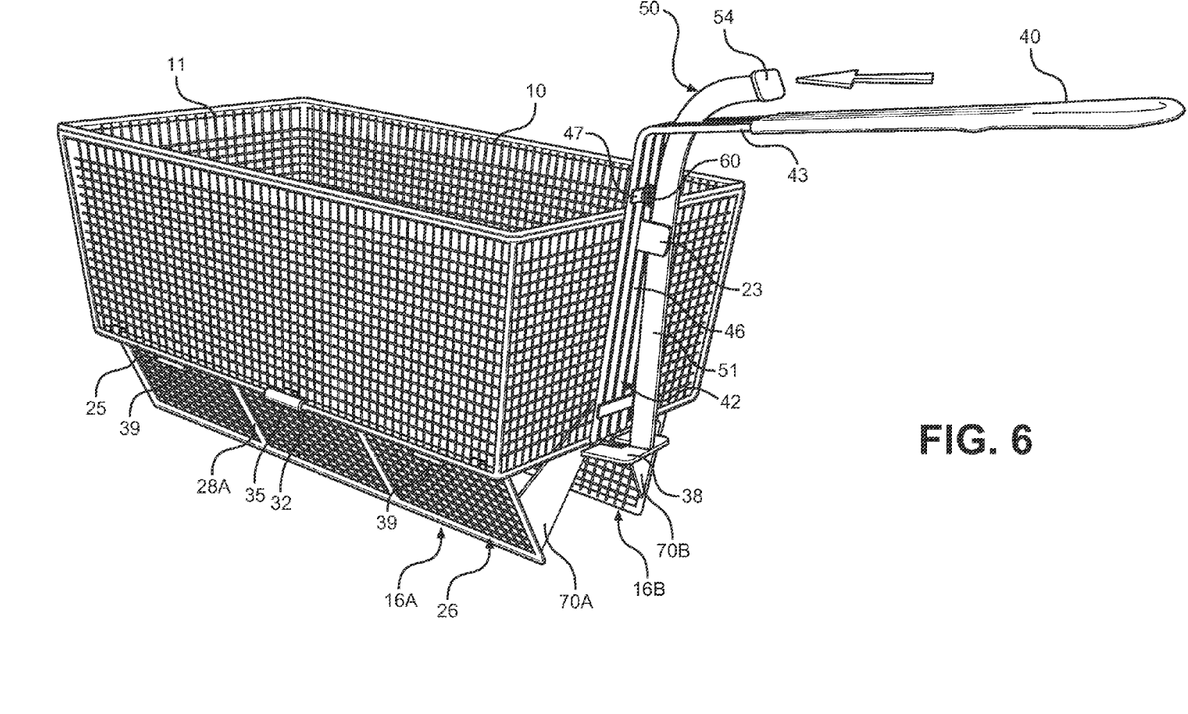
FIG. 6 is rear perspective view of an embodiment of the invention showing two pivotally mounted bottom panels.

As previously noted and with reference to FIG. 6, the bottom may be formed of two bottom panels 16A and 16B, each being pivotally mounted to opposite sides of the bottom frame of the basket and wherein stops would be provided to limit the opening motion of the panels as set forth herein and where one or both bottom panels would carry a blocking member such as 70A and 70B.

As shown in FIG. 6, each bottom wall or panel 16A and 16B is pivotally mounted to one of the side portions or members 25 of the bottom frame 24 by at least one hinge or pivot member 34 that is welded or otherwise fixedly secured to a side portion 29 the bottom panel frame 26, as described with respect to the prior embodiment, and a second open tubular portion 35 through which the adjacent side member 25 of the bottom frame 24 of the basket extends. Two small lugs are welded to the side member 25 on opposite sides of the tubular portion 35, also as previously described with respect to the one bottom panel embodiment, so as to prevent relative longitudinal motion between the bottom panel and the lower frame of the fryer basket.

As with the prior embodiment, it is preferred that the pivoting motion of the bottom walls or panels be limited between a fully closed position to a fully open position which is not greater than 90° from the closed position, and which position is preferably between 60° and 80° as illustrated in FIG. 6. In some embodiments, two or more spaced hinge or pivot members may be used to pivotally secure the bottom panels to the bottom frame 24. The at least one hinge or pivot member 34 permits each bottom panel to pivot freely under its own weight to the open position when the bottom panel is not retained in its closed position by a retention latch plate 38, as previously described. To limit the pivoting motion of the bottom panels 16A and 16B, a pair of stops 39 are welded to the bottom frame 24 on opposite ends of the at least one hinge or pivot member 35 and extend downward therefrom as shown so that as the bottom panels pivot about the side members 25 of the lower basket frame 24, the outer frames 26 thereof will engage the stops before the bottom panels can swing farther than 90° relative to their fully closed position. It is important to limit the pivoting motion of the bottom panels in order to maintain the bottom panels in a position to facilitate closing. By maintaining the bottom panels at an angle of slightly less than 90°, such as between 60° and 80°, the panels may be urged to a closed position by simply resting the basket against a surface such as a side edge of a fryer. In this manner, it is not necessary to manually manipulate the bottom panels to urge them to their closed position. When moved to their closed position, the blocking or latch plate 38 is automatically moved into position beneath the two bottom panels to thereby retain them in a closed position.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A fryer basket for frying food products, comprising, a basket having opposite side and front and rear walls and a bottom panel which are joined by at least a bottom frame, a least one portion of the bottom panel being movable from a closed position relative to the side walls to an open position relative to the bottom frame, a handle mounted to the basket so as to extend rearwardly of the rear wall thereof and having a handgrip portion extending therefrom, a latch mechanism mounted to the basket adjacent the rear wall and including a lever member movable from a first position to a second position, the lever member having a lower portion from which a latch plate extends to a first locking position beneath the at least one portion of the bottom panel when the lever member is in the first position to thereby retain the at least one portion in the closed position thereof, the lever member having an upper end extending from the basket toward the handgrip of the handle so that the upper end of the lever member may be manually engaged to thereby pivot the lever member to the second position wherein the latch plate is moved to an unlocked position spaced from the at least one portion of the bottom panel so that the at least one portion will open relative to the side walls of the basket to thereby define a discharge opening through which food product within the fryer basket will be discharged, and a blocking member carried by the at least one portion of the bottom panel for engaging the latch plate to retain the latch plate in the unlocked position as the at least one portion of the bottom panel pivots between its closed to its open position and back to its closed position, and spring means for automatically moving the latch plate to its closed position as soon as the at least one portion of the bottom panel returns to its closed position.

2. The fryer basket of claim 1 including at least one stop member mounted to a portion of the basket so as to limit the opening motion of the at least one portion of the bottom panel by engaging the at least one portion as it pivots open.

3. The fryer basket of claim 2 including a bracket mounted to the rear wall of the basket, and the lever member being pivotally mounted to the bracket.

4. The fryer basket of claim 3 wherein the resilient means is mounted to the basket between the bracket and the upper end of the lever member.

5. The fryer basket of claim 1 wherein the basket includes a bottom frame having opposite sides, the at least one portion of the bottom wall including one bottom panel which defines the bottom wall of the basket and which has an outer frame having opposite sides, at least one open cylinder member mounted to one of the sides of the bottom frame of the basket through which one of the sides of the outer frame of the bottom panel is pivotally mounted.

6. The fryer basket of claim 5 wherein the at least one stop member includes at least one fixed projection mounted to the bottom frame of the basket which is positioned to engaged the bottom panel to limit an opening motion thereof.

7. The fryer basket of claim 6 wherein the at least one fixed projection is of a size to limit the bottom panel from opening through an angle of greater than 90° between its closed to open position.

8. The fryer basket of claim 1 wherein the blocking member is formed as a flat plate that extends upwardly from an end portion of the at least one portion of the bottom panel in a position to be slidably engagable against the rear wall of the basket and of sufficient height so as to continuously engage the rear wall as the at least one portion of the bottom panel pivots to its open position to thereby retain the latch plate in its unlocked position.

9. The fryer basket of claim 1 wherein the at least one portion of the bottom panel includes two bottom panels which are pivotally mounted relative to the bottom frame of the basket, and at least one of the two bottom panels includes the blocking member mounted thereto.

10. The fryer basket of claim 9 wherein the latch plate engages each of the two bottom panels when the bottom panels are closed relative to the opposite side and front and rear walls of the basket.

11. The fryer basket of claim 9 wherein a blocking member is mounted to each of the two bottom panels.

12. The fryer basket of claim 9 wherein each of the two bottom panels includes an outer frame having opposite sides, at least one pivot member mounted one of the sides of the outer frames of each of the bottom panels, each pivot member including at least one open cylinder member, and one of opposing sides of the bottom frame of the basket extending through an adjacent one the open cylinder members whereby the two bottom panels are pivotally mounted to the bottom frame.

13. The fryer basket of claim 12 including lugs provided on the opposing sides of the bottom frame of the basket adjacent opposite ends of the cylinder members to thereby limit lateral movement of the two bottom panels relative to the bottom frame of the basket.

14. The fryer basket of claim 9 wherein the at least one stop member includes at least one fixed projection mounted to each of the opposing side walls of the bottom frame of the basket which are positioned to engaged the two bottom panels to limit an opening motion thereof.

15. The fryer basket of claim 14 wherein each of the at least one fixed projections is of a size to limit the two bottom panels from opening through an angle of greater than 90° between closed to open positions.

16. The fryer basket of claim 9 wherein the blocking member is formed as a flat plate that extends upwardly from an end portion of the at least one of the two bottom panels in a position to be slidably engagable against the rear wall of the basket and of sufficient height so as to continuously engage the rear wall as the at least one of the two bottom panels pivots to its open position to thereby retain the latch plate in its unlocked position.

\* \* \* \* \*